(12) United States Patent
Mirkin et al.

(10) Patent No.: US 7,033,415 B2
(45) Date of Patent: Apr. 25, 2006

(54) METHODS OF CONTROLLING NANOPARTICLE GROWTH

(75) Inventors: Chad A. Mirkin, Wilmette, IL (US); Gabriella S. Métraux, Evanston, IL (US); Rongchao Jin, Evanston, IL (US); YunWei Charles Cao, Gainesville, FL (US)

(73) Assignee: Northwestern University, Evanston, IL (US)

( * ) Notice: Subject to any disclaimer, the term of this patent is extended or adjusted under 35 U.S.C. 154(b) by 3 days.

(21) Appl. No.: 10/817,754

(22) Filed: Apr. 2, 2004

(65) Prior Publication Data
US 2005/0188789 A1 Sep. 1, 2005

Related U.S. Application Data

(60) Provisional application No. 60/460,152, filed on Apr. 2, 2003.

(51) Int. Cl.
*C22C 5/06* (2006.01)
*B22F 1/00* (2006.01)

(52) U.S. Cl. .......................................... 75/345; 75/634
(58) Field of Classification Search .................... None
See application file for complete search history.

(56) References Cited

U.S. PATENT DOCUMENTS

| | | | |
|---|---|---|---|
| 6,120,588 A | 9/2000 | Jacobson | 106/31.16 |
| 6,323,989 B1 | 11/2001 | Jacobson et al. | 359/296 |
| 6,422,687 B1 | 7/2002 | Jacobson | 347/55 |
| 6,538,801 B1 | 3/2003 | Jacobson et al. | 359/296 |
| 6,608,716 B1 * | 8/2003 | Armstrong et al. | 359/342 |
| 2002/0015150 A1 * | 2/2002 | Armstrong et al. | 356/301 |
| 2002/0192687 A1 | 12/2002 | Mirkin | 435/6 |
| 2003/0022169 A1 | 1/2003 | Mirkin | 435/6 |
| 2003/0136223 A1 * | 7/2003 | Jin et al. | 75/345 |
| 2004/0008430 A1 * | 1/2004 | Borra et al. | 359/843 |
| 2004/0147618 A1 * | 7/2004 | Lee et al. | 516/78 |
| 2005/0078158 A1 * | 4/2005 | Magdassi et al. | 347/100 |

OTHER PUBLICATIONS

Jensen et al., *J. Phys. Chem. B.* 2000, 104(45):10549-10556.
Lange's Handbook of Chemistry, 11th edition, 1973, Table 3-9, p. 122, Section 3.
Kottman et al., *Optics Express* 2000, 6(11):213-219.

* cited by examiner

*Primary Examiner*—George Wyszomierski
(74) *Attorney, Agent, or Firm*—Marshall, Gerstein & Borun LLP

(57) ABSTRACT

The invention provides new types of plasmon-driven growth mechanism for silver nanostructures involving the fusion of triangular nanoprisms. This mechanism, which is plasmon excitation-driven and highly cooperative, produces bimodal particle size distributions. In these methods, the growth process can be selectively switched between bimodal and unimodal distributions using dual beam illumination of the nanoparticles. This type of cooperative photo-control over nanostructure growth enables synthesis of monodisperse nanoprisms with a preselected edge length in the 30–120 nm range simply by using one beam to turn off bimodal growth and the other (varied over the 450–700 nm range) for controlling particle size.

31 Claims, 10 Drawing Sheets

METHODS OF CONTROLLING NANOPARTICLE GROWTH

CROSS-REFERENCE TO RELATED APPLICATIONS

This application claims priority to U.S. Provisional Patent Application Ser. No. 60/460,152, filed 2 Apr. 2003, which is incorporated herein by this reference in its entirety.

GOVERNMENT INTEREST

This invention was made with Government support under Grant No. EEC-0118025 awarded by the National Science Foundation, Grant No. N00014-03-1-0800 awarded by the Office of Naval Research, and Grant No. F49620-02-1-0180/P00001 awarded by the Air Force Office of Scientific Research. The Government has certain rights in this invention.

FIELD OF THE INVENTION

The invention resides in the field of nanoparticles and specifically in methods of forming silver nanoprisms of varying sizes.

BACKGROUND OF THE INVENTION

Nanoclusters are an important class of materials that are having a major impact in a diverse range of applications, including chem- and biodetection, catalysis, optics, and data storage. The use of such particles dates back to the middle ages, and the scientific study of them has spanned over a century. These nanostructures are typically made from molecular precursors, and there are now a wide variety of compositions, sizes, and even shapes available. Because of their unusual and potentially useful optical properties, nanoprism structures in particular have been a recent synthetic target of many research groups. We recently reported a high yield photosynthetic method for the preparation of triangular nanoprisms from silver nanospheres. For many nanoparticle syntheses, an Ostwald ripening mechanism, where large clusters grow at the expense of smaller ones, is used to describe and model the growth processes. This type of ripening typically results in unimodal particle growth. Thus, method of controlling the growth and ultimate dimensions of such structures is desired. Such a method will necessarily fall outside of the known Ostwald ripening mechanisms.

SUMMARY OF THE INVENTION

The present invention provides a method of forming nanoprisms by exposing silver particles to a wavelength of light between about 400 nm and about 700 nm for a period of less than about 60 hours. The nanoprisms formed have a bimodal size distribution. Preferably, the silver particles are present in a colloid containing a reducing agent, a stabilizing agent and a surfactant. If the colloid contains a stabilizing agent and a surfactant, the ratio of the stabilizing agent to the surfactant is preferably about 0.3:1. The nanoparticle starting materials have a diameter between 0.2 nm and about 15 nm. The nanoprisms formed are single crystalline and have a {111} crystal face on a base plane of the nanoprism and a {110} crystal face on a side plane of the nanoprism and display plasmon bands having $\lambda$max at 640 nm and 1065 nm, 340 nm and 470 nm.

Another embodiment of the present invention provides a method of forming a nanoprism by exposing silver nanoparticles to a primary and a secondary wavelength of light such that one of the primary and secondary wavelengths of light excites quadrupole plasmon resonance in the silver particles. In this embodiment, one of the primary and secondary wavelengths of light coincides with the out-of-plane quadrupole resonances of the silver nanoprisms. In a preferred embodiment of this method, the secondary wavelength of light is about 340 nm and the primary wavelength of light is in the range of about 450 nm and about 700 nm.

By adjusting the primary wavelength of light used in these embodiments of the present invention, the edge length of the nanoprisms produced can be controlled. When the secondary wavelength of light is about 340 nm and the primary wavelength of light is in the range of about 450 nm and about 700 nm, the nanoprisms produced have an edge length of between about 31 nm and about 45 nm. Alternatively, if the primary wavelength of light is in the range of about 470 nm and about 510 nm, the nanoprisms have an edge length between about 53 nm and about 57 nm. Alternatively, if the primary wavelength of light is in the range of about 500 nm and about 540 nm, the nanoprisms have an edge length between about 53 nm and about 71 nm. Alternatively, if the primary wavelength of light is in the range of about 530 nm and about 570 nm, the nanoprisms have an edge length between about 64 nm and about 80 nm.

Alternatively, if the primary wavelength of light is in the range of about 580 nm and about 620 nm, the nanoprisms have an edge length between about 84 nm and about 106 nm. Alternatively, if the primary wavelength of light is in the range of about 650 nm and about 690 nm, the nanoprisms have an edge length between about 106 nm and about 134 nm.

DETAILED DESCRIPTION OF THE INVENTION

The invention provides a method of controlling the growth and size of nanoprisms formed from a metal colloid by excitation of surface plasmons. This method provides control over nanoparticle growth allowing the synthesis of monodisperse samples of nanoprisms having a desired edge length simply by controlling the excitation wavelength of a narrow band light source. Exposure to a light source having the correct excitation wavelength causes plasmon excitation on the surface of the metal nanoparticles. When a single beam (e.g. 550+/−20 nm) was used, it has been surprisingly found that the suspension of nanoprisms formed consists of two different size distributions, of which the smaller (designated as Type 1) and the larger nanoprisms (designated Type 2) have average edge lengths in the range of about 55 nm to about 85 nm and about 130 nm to about 170 nm, respectively (FIG. 1A).

Figure 1:
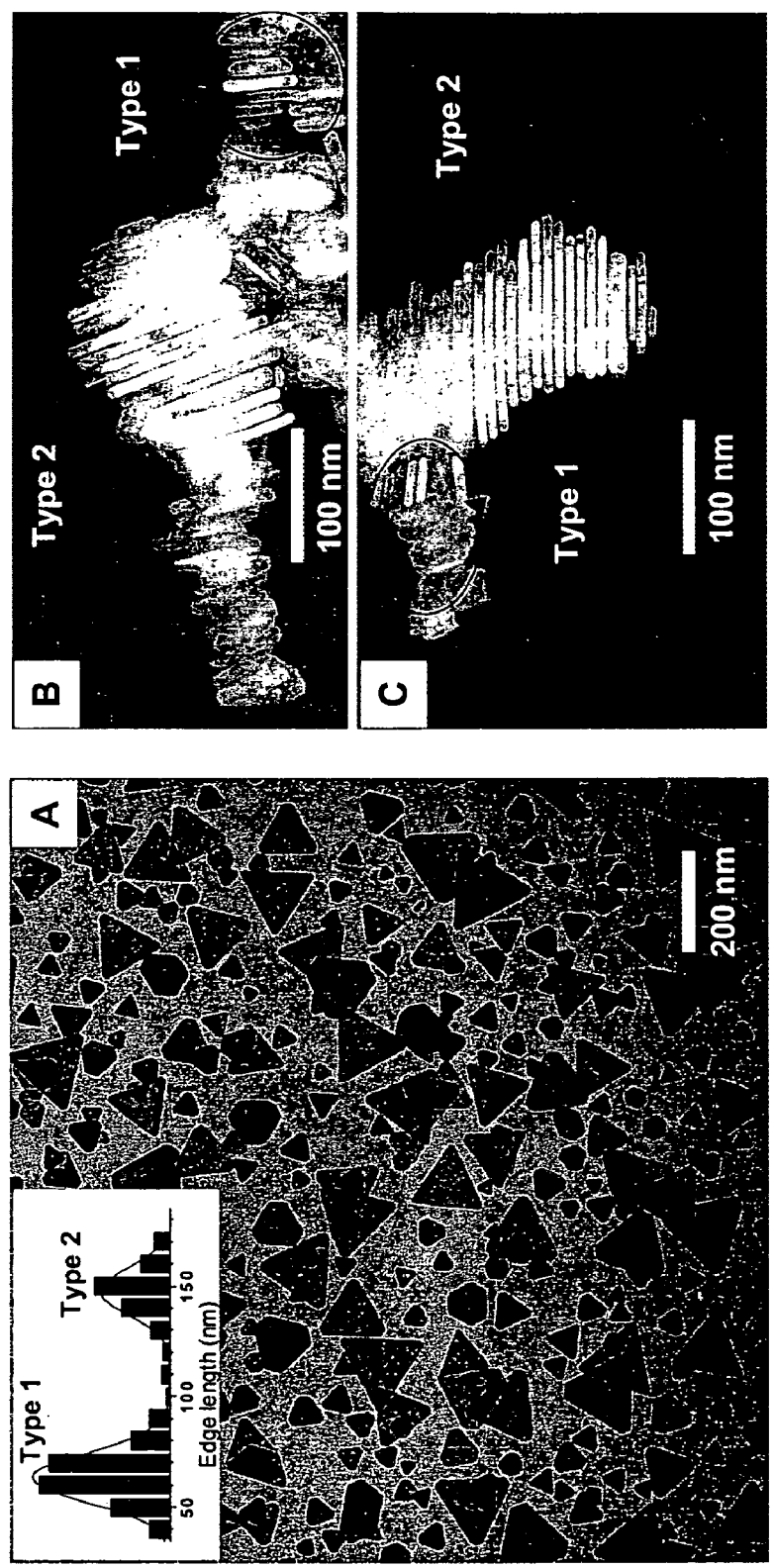
FIG. 1(A) shows a transmission electron microscopy (TEM) image of a sample of silver nanoprisms formed using single beam excitation (550±20 nm) and the inset shows the histograms used to characterize the size distribution as bimodal.
FIGS. 1(B) and (C) are TEM images of nanoprism stacks showing the two different sized nanoprisms having nearly identical thicknesses (9.8±1.0 nm).

These nanoprisms form stacks, and therefore, edge views allow precise determination of the nanoprism thickness (FIG. 1B–C). Although the average edge lengths for the Type 1 and Type 2 nanoprisms are significantly different, their thicknesses are almost identical between about 8 nm and about 11 nm. Both types of nanoprisms are single crystalline with face-centered cubic (fcc) structures. The {111} crystal face forms the top/base plane of the nanoprism, and three {110} crystal faces form the side planes.

During the formation reaction, the plasmon band at approximately 395 nm associated with the spherical silver particles disappears while two new strong bands having $\lambda_{max}$ at 640 nm and 1065 nm associated with the Type 1 and Type 2 nanoprisms, respectively, appear. The band for the Type 1 prisms is initially centered at $\lambda_{max}$=680 nm and gradually blue shifts to $\lambda_{max}$=640 nm. This blue shifting correlates with the tip sharpness of the nanoprism features as rounding is known to lead to blue-shifting. The second strong band at $\lambda_{max}$=1065 nm is assigned to Type 2 particles. As shown by curve 6 in FIG. 2A, two other weak resonances having $\lambda_{max}$ at 340 nm and 470 nm are observed in addition to the two strong surface plasmon bands.

Figure 2:
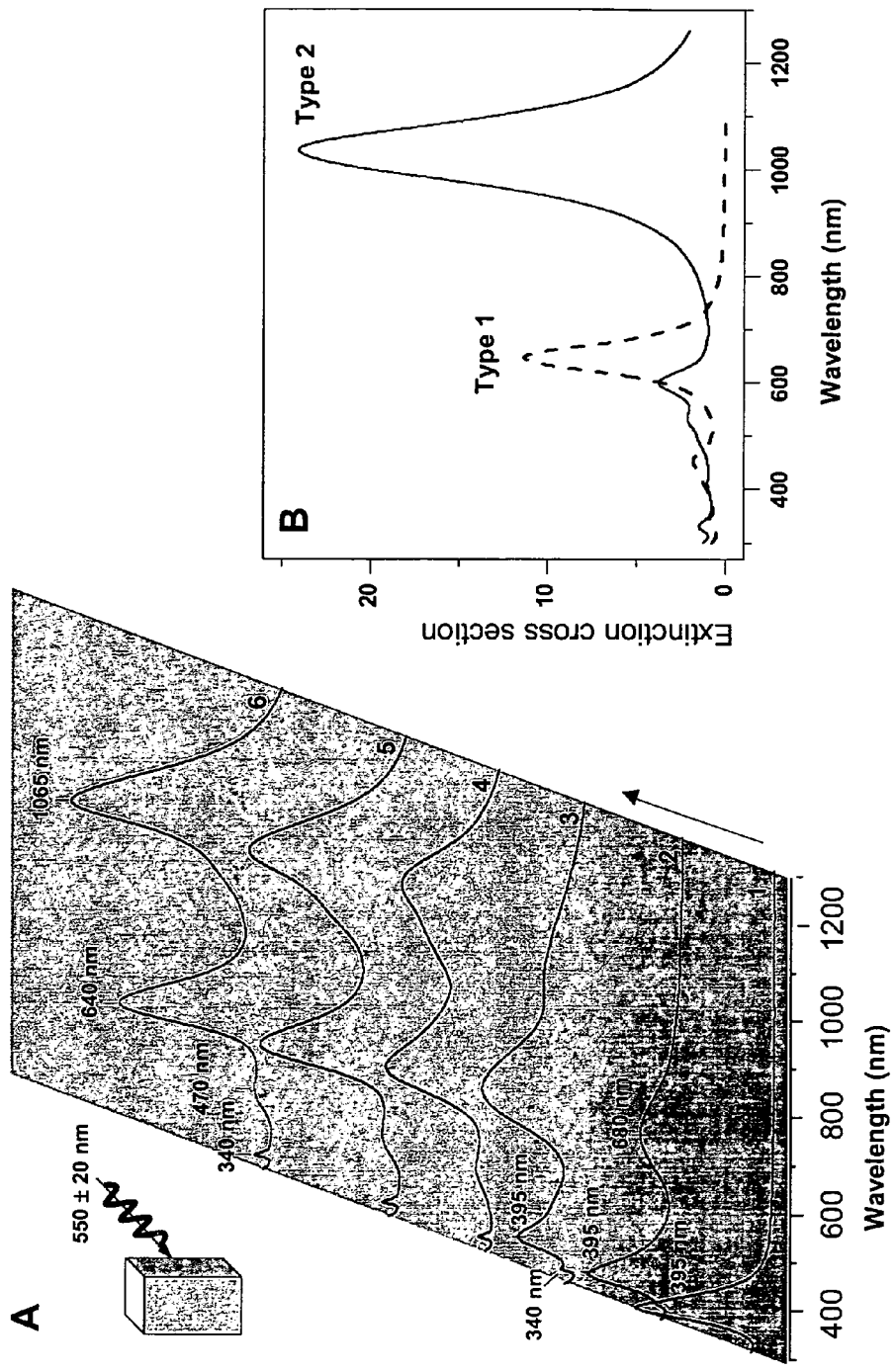
FIG. 2(A) shows the time evolution of ultra violet-visible-near infra red (UV-VIS-NIR) spectra of a silver colloid (4.8±1.1 nm spheres) under single beam excitation (550±20 nm). In the graph, curve 1 is the initial colloid, curve 2 is at a time of 10 h, curve 3 is at a time of 15 h, curve 4 is at a time of 19 h, curve 5 is at a time of 24 h, curve 6 is at a time of 55 h.
FIG. 2(B) is the theoretical modeling of the optical spectra of two different sized nanoprisms (edge length of Type 1=70 nm, Type 2=150 nm, thickness=10 nm).

Theoretical modeling using a finite element-based method known as the discrete dipole approximation (DDA) shows plasmon bands that reproduce the experimentally observed spectrum. For example, by comparing FIG. 2(B) and curve 6 of FIG. 2(A), unambiguous peak assignments can be provided. The first three peaks in the spectrum of the colloid containing both Type 1 and Type 2 particles, 340 nm (out-of-plane quadrupole resonance), 470 nm (in-plane quadrupole resonance) and 640 nm (in-plane dipole resonance), result from the Type 1 nanoprisms. In the case of the Type 2 nanoprisms, only the strong dipole resonance at 1065 nm is clearly observed. FIG. 2(B) shows that quadrupole resonances, which occur at 340 nm and 600 nm in the solution of the Type 2 nanoprisms, are overlapped with plasmon bands from the Type 1 nanoprisms. These time-dependent optical spectra are consistent with a bimodal process rather than the unimodal growth processes expected for the conventional Ostwald ripening of the prior art.

The nanoprisms are composed of silver present in the silver colloid starting material. Any silver salt can be used to form the silver nanoparticles. Preferably, the silver salt is $AgNO_3$, $CH_3CO_2Ag$, $AgClO_4$, $Ag_2SO_4$ or combinations of these silver salts. The silver nanoparticles used to obtain the silver nanoprisms are less than about 15 nm in diameter and preferably less than about 10 nm in diameter. More preferably, the silver nanoparticles are between about 2 nm and about 6 nm in diameter. Most preferably, the silver nanoparticles are about 4.8 nm in diameter.

The colloidal silver suspension that forms the starting material can be formed by any means to contain silver nanoparticles falling within the desired size range. Many methods of forming a silver colloid are known in the art and generally all include different forms of agitation to produce the colloidal particles. The colloidal suspension may also include other chemicals that do not participate in the reaction forming the nanoprisms. For example, reducing agents, suspending agents, surface acting agents, particle stabilizing agents and the like can be used in formation of the suspension without adversely affecting the formation of the nanoprisims in the methods of the present invention. The colloid can be easily prepared using the methods described by Cao et al. (Cao, Y. W.; Jin, R.; Mirkin, C. A. J. Am. Chem. Soc. 123, 7961 (2001)) which includes vigorous stirring in the presence of sodium borohydride followed by the addition of Bis (p-sulfonatophenyl) phenylphosphine dihydrate dipotassium (BSPP) and additional stirring. Surfactants used to form the suspension of nanospheres may vary widely in concentration without affecting the extent of the conversion of nanospheres to nanoprisms. However, the reaction rate is affected by surfactant and provides an additional means of controlling the conversion reaction based on the conversion rate. Preferably, trisodium citrate is present as a surfactant in the suspension of silver nanospheres and bis(p-sulfonatophenyl) phenylphosphine dihydrate (BSPP) is added to the suspension as a particle stabilizing agent. Although the nanoprisms are formed over the entire range of surfactant concentration, the rate of the conversion reaction decreases as a function of increasing the ratio of BSPP to citrate over a range of about 0.01 to about 1. The most rapid conversion rate is obtained at a BSPP to citrate ratio of 0.3:1. Thus, the reaction rate may be optimized by varying the surfactant concentration and the ratio of the surfactant to a stabilizing agent added to the suspension.

The light source used to produce the nanoprisms having a bimodal size distribution must possess a wavelength that generates the plasmon excitation resulting in nanoprism formation and growth. The excitation wavelength is between about 400 nm and about 700 nm. Preferably the excitation wavelength is between about 530 nm and 570 nm. More preferably, the excitation wavelength is about 550 nm. However, the bimodal growth of the nanoprisms is not caused by the wavelength dispersity of the excitation beam. For example, when a monochromatic laser beam having a wavelength of 532.8 nm (the second harmonic of a Nd:YAG laser) is used to photolyze the silver colloids, bimodal growth is still observed. Preferably, a narrow band light source is used to irradiate the silver colloid. A 150 watt xenon lamp having a light output of about 12 watts with an optical bandpass filter having a center wavelength of 550 nm and a width of 40 nm is suitable for use in the methods of the present invention although one of skill in the art will recognize that many suitable light sources producing a light having a wavelength within the desired range are available for use in the methods of the present invention. The colloid is exposed to the light for a period of time that is dependent upon the intensity of the light used. The exposure time is usually less than about 100 hours and typically the exposure time is about 60 hours.

Figure 6:
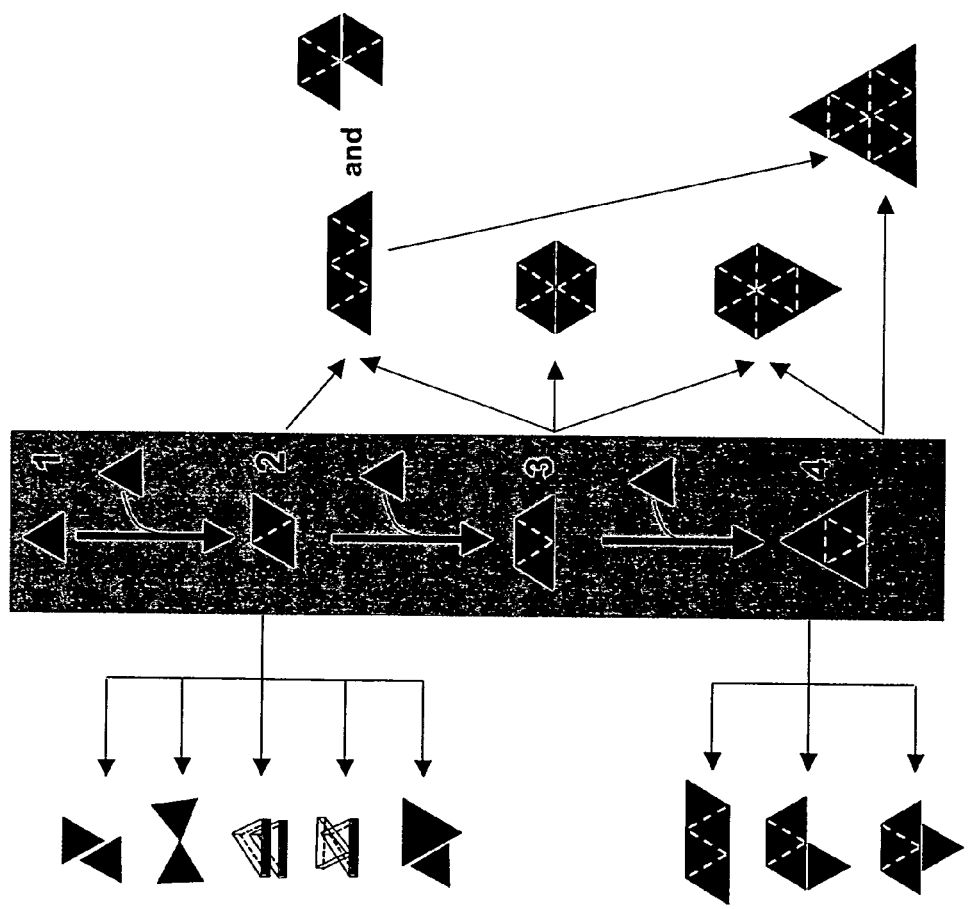
FIG. 6 is a schematic of the proposed mechanism for bimodal growth in which an edge-selective particle fusion mechanism where four Type 1 nanoprisms come together in step-wise fashion to form a Type 2 nanoprism.
Figure 7:
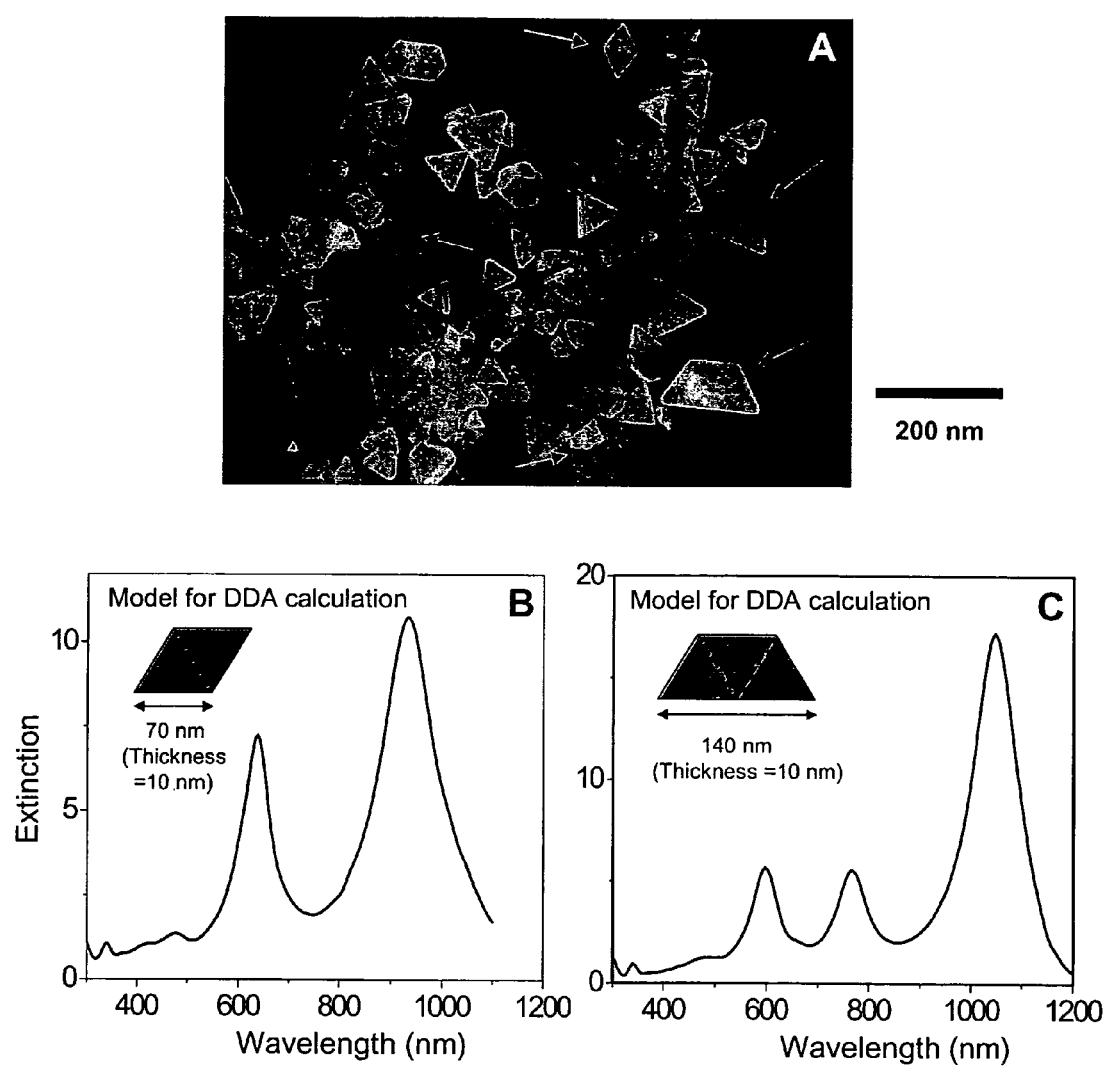
FIG. 7(A) is a TEM image showing dimer and trimer intermediate species depicted in FIG. 6.
FIGS. 7(B) and (C) are theoretical modeling of the optical spectra of the dimmer and timer species.

Without intending to be bound by any single theory, it is believed that the observed bimodal growth process results from an edge-selective particle fusion mechanism wherein four smaller, Type 1, nanoprisms come together in step-wise fashion to form a larger, Type 2, nanoprism as depicted in the shaded region of FIG. 6. Several observations are consistent with this mechanism. First, bimodal growth results in Type 1 and Type 2 prisms where four of the former prisms can fit together to form a prism with dimensions (cumulative edge length=140±17 nm) that compare well with the latter (150±16 nm). Second, edge selective growth occurs with no apparent change in nanostructure thickness in going from the Type 1 to Type 2 nanoprisms. Third, as shown in FIG. 2(A), detailed time-dependent UV-VIS-NIR measurements show that the onset of the growth of the band at 1065 nm (assigned to Type 2) is significantly delayed in comparison with the growth of the band at 640 nm (assigned to Type 1) indicating that the fusion of nanoprisms occurs only after Type 1 nanoprisms accumulate. Fourth, as shown in FIG. 7, dimer and trimer intermediates (depicted as 2 and 3, respectively, in FIG. 6) are observed during the early stages of Type 2 nanoprism growth. Electrodynamics calculations for the possible intermediate species in the fusion growth process show that the dimer and trimer intermediates have plasmon excitations close to 600 and 1065 nm meaning that Type 1 nanoprisms and the dimmer/trimer intermediates can all absorb at 600 nm. This leads to the excited state needed for particle fusion. However, Type 2 nanoprisms do not absorb at that wavelength, which is why these nanoprisms represent the end of the nanoparticle growth path.

This edge- and crystal face-selective (side={110} lattice planes) fusion growth is unusual, especially in view of the many other possible products that could arise from oligomerization of the Type 1 nanoprisms depicted in FIG. 6 outside of the shaded region. If these forms exist, they must be in a fast equilibrium with the main growth route (shaded in Scheme 1), since they are not observed by TEM. While methods of fusing spherical nanoparticles into nanowire structures (CdTe or PbSe) after removal of surface ligands, as well as other examples involving spherical particle fusion, are known in the art, the methods of the present invention are the only methods that use photochemistry to effect the edge- and crystal face-selective particle fusion process.

Figure 8:
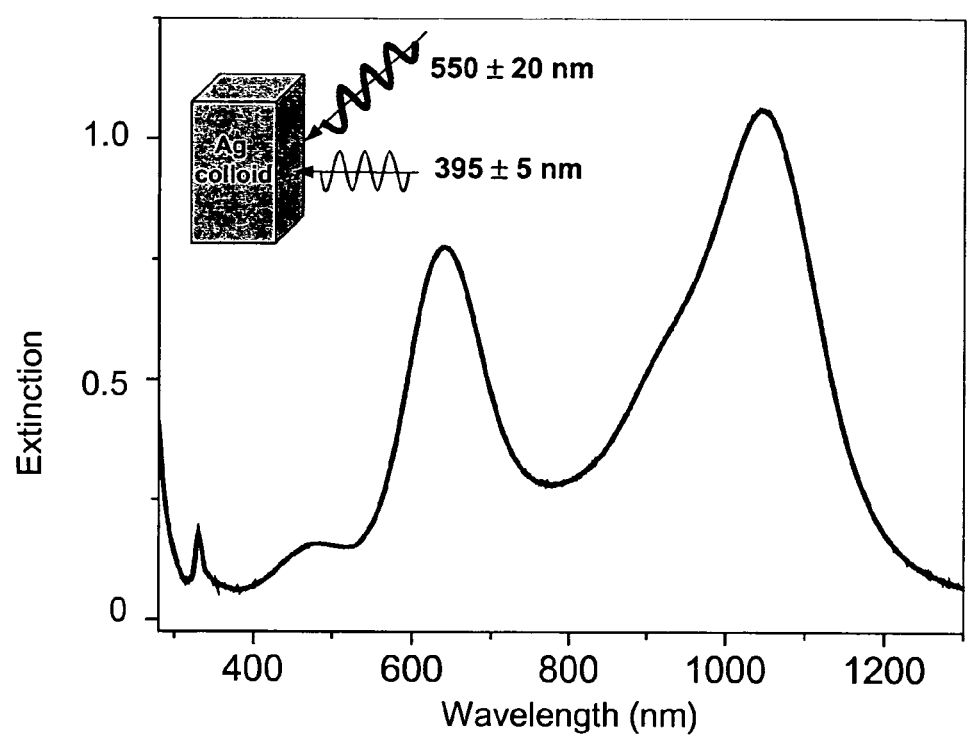
FIG. 8 Shows the optical spectrum of a silver colloid after dual beam 550 nm/395-nm excitation. 395-nm corresponds to the dipole plasmon of silver nanospheres. Such a coupled bean excitation pattern does not effect a unimodal growth process.
Figure 9:
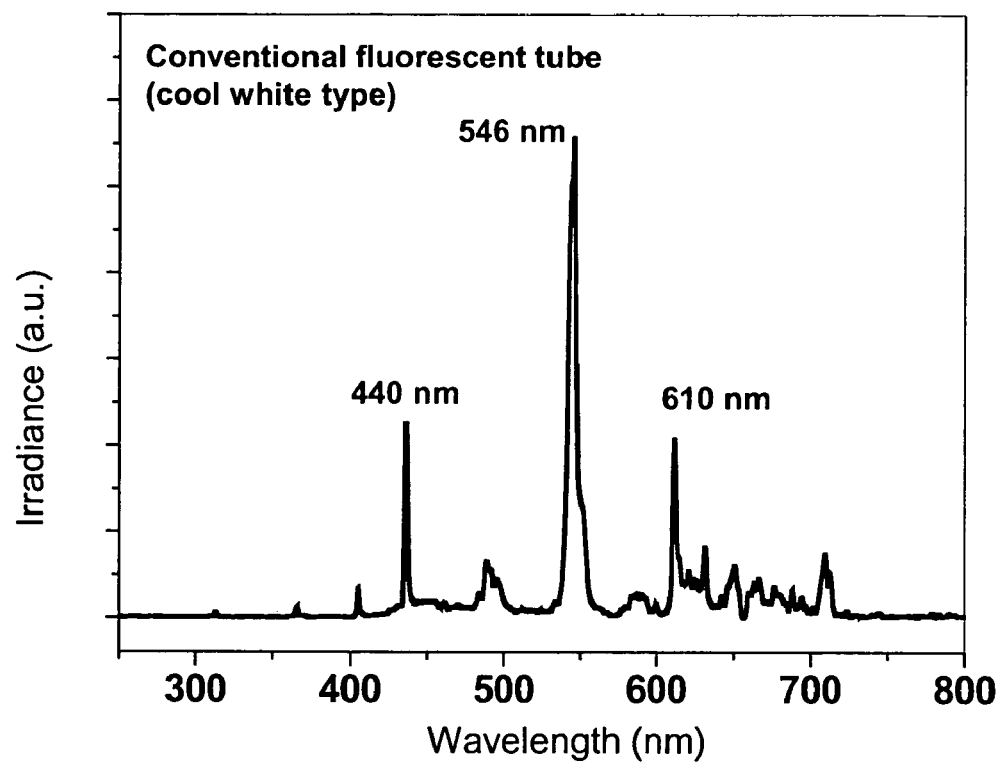
FIG. 9 shows the emission spectrum of a fluorescent tube.

The bimodal growth appears to contradict previous results in which unimodal nanoprism growth was observed when visible light from a conventional fluorescent tube was used as the excitation source (co-pending U.S. patent application Ser. No. 10/256,875; Publication No. 20030136223 A1). However, by careful analysis of the optical properties of these nanostructures and the effects of photolysis on them, surface plasmon cooperativity has been identified in the photochemistry of silver nanoprisms. As shown schematically in FIG. 3(A), excitation of a solution of silver nanoparticles at two wavelengths, 550±20 nm (primary) and 450±5 nm (secondary) ($I_{550}:I_{450}=2:1$, FIG. 3A) completely inhibits the formation of Type 2 nanoprisms. This treatment results in the exclusive formation of the smaller, Type 1, nanoprisms. By varying the wavelength of the secondary beam, a 550-nm/340-nm coupled beam, in which the 340-nm light coincides with the out-of-plane quadrupole resonances of the Type 1 and Type 2 nanoprisms, can also inhibit the growth of Type 2 nanoprisms. As shown in FIG. 8 however, in the cases of 550-nm/395-nm, 550-nm/610-nm, and 550-nm/650-nm coupled beams, in which the secondary wavelengths fall within the dipole resonances of the silver nanospheres (395 nm) and Type 1 nanoprisms (610 and 650 nm), respectively, bimodal growth is observed. Thus only secondary wavelengths that can excite quadrupole plasmon modes can inhibit bimodal growth. It is this photo-cooperativity that leads to the results observed with a fluorescent tube as the excitation source. Interestingly, the emission spectrum of a fluorescent tube, shown in FIG. 9, exhibits bands at 546-nm and 440-nm and has the appropriate intensity ratio (100%:40%) to effect photosynthetic cooperativity and hence unimodal growth. Consistent with this conclusion, when a 550± 20 nm band filter is used with a fluorescent tube to effect the photosynthetic conversion, bimodal growth is observed.

Thus, in a preferred embodiment of the present invention, the silver colloid starting material is exposed to light of two different wavelengths to produce dual beam excitation and unimodal growth. Using this method, bimodal growth can be selectively turned off with one fixed secondary beam allowing the formation of nanoprisms having a desired edge length, through a unimodal growth process. This type of cooperative photo-control over nanoparticle growth results in the synthesis of relatively monodisperse samples of nanoprisms with a desired edge length in the range of about 30 nm to about 120 nm simply by controlling the excitation wavelength of the primary beam. Therefore, this embodiment provides the first methods of controlling particle size and shape using light as a directing element. By varying the primary light source between the wavelength of about 450 nm and about 700 nm, with a fixed secondary beam corresponding to the out-of-plane quadrupole plasmon excitation unimodal growth results to generate a solution of nanoprisms of a desired average size.

Using this method, it is possible to synthesize nanoprisms with in-plane dipole plasmon resonances with edge lengths ranging from about 30 nm to about 120 nm. The average edge lengths of the resulting nanoprisms correlate well with the wavelength of the primary excitation source in which a longer primary excitation wavelength produces larger particles with in-plane dipole plasmons (the red-most peak in each spectrum) that are red-shifted with respect to the excitation wavelength. For example, when the secondary wavelength of light is fixed at 340 nm and the primary wavelength of light is between about 430 nm and about 470 nm and the nanoprisms have an edge length between about 31 nm and about 45 nm; when the secondary wavelength of light is fixed at 340 nm and the primary wavelength of light is between about 470 nm and about 510 nm the nanoprisms have an edge length between about 53 nm and about 57 nm; when the secondary wavelength of light is fixed at 340 nm and the primary wavelength of light is between about 500 nm and about 540 nm, the nanoprisms have an edge length between about 53 nm and about 71 nm; when the secondary wavelength of light is fixed at 340 nm and the primary wavelength of light is between about 530 nm and about 570 nm, the nanoprisms have an edge length between about 64 nm and about 80 nm; when the secondary wavelength of light is fixed at 340 nm and the primary wavelength of light is between about 580 nm and about 620 nm, the nanoprisms have an edge length between about 84 nm and about 106 nm; and when the secondary wavelength of light is fixed at 340 nm and the primary wavelength of light is between about 650 nm and about 690 nm, the nanoprisms have an edge length between about 106 nm and about 134 nm. This type of growth is not necessarily a result of particle fusion.

Figure 10:
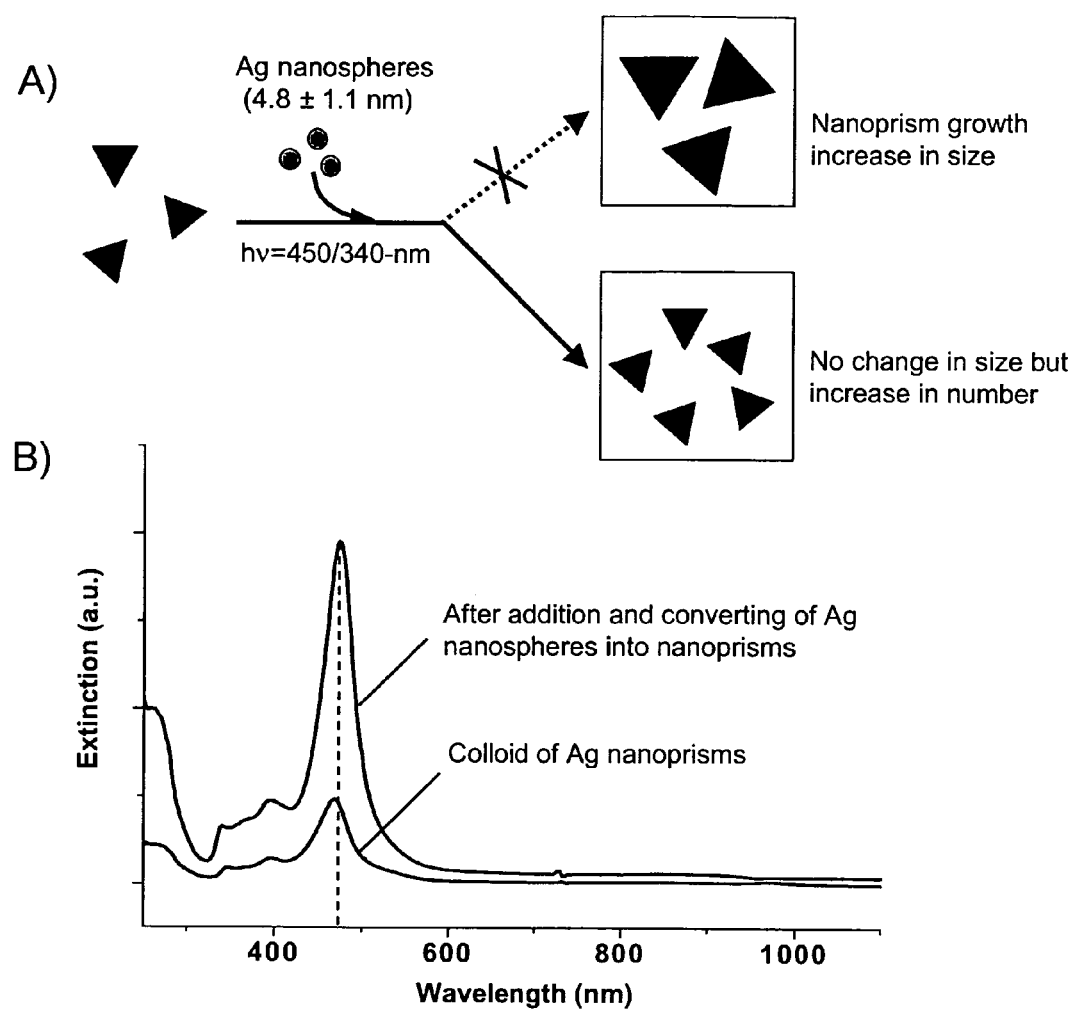
FIG. 10(A) is a scheme depicting two possible nanoprism growth routes when spherical silver particles (4.8±1.1 nm) are added to an existing colloid of nanoprisms (edge length of 38±7 nm). (B) The UV-VIS-NIR spectrum of the colloid after the silver nanospheres described in (A) have been completely converted into nanoprisms (top line) is almost identical to the spectrum for the 38 nm stating prisms (bottom line).

Another feature of using wavelength to control the size of the nanoprisms formed is that, as shown in FIG. 10, subsequent addition of silver spherical nanoparticles to the nanoprism colloid does not lead to enlargement of the nanoprism but instead the added particles grow into nanoprisms similar in size to those present as determined by the excitation wavelength. This result is in contrast with conventional thermal strategies for controlling particle sizes, in which addition of precursors typically leads to larger particles. Therefore, the methods of the present invention represent fundamentally new ways of controlling particle size through wavelength modulation.

The particle size control observed here is not a result of photothermal (or optical "burning") effects as those effects have been invoked in other studies involving intense pulse laser irradiation of metal nanostructures. By comparison, the light source used to effect nanoparticle conversion by the methods of the present invention is very weak, having a beam power of less than about 0.2 watts. According to the equation, $\Delta T = \Delta H/C_p$ where, $\Delta H$ is the absorbed photon energy, and $C_p$ is the heat capacity of silver (0.235 J·K$^{-1}$·g$^{-1}$), single 550 nm photon absorption by a Type 1 prism can only lead to a negligible increase in temperature and the cumulative experimentally-determined temperature increase after 50 hours of photolysis (550±20 nm) was less than 10° C. Thus, photo-induced thermal effects are not responsible for the particle growth and size control in the methods of the present invention.

Surface plasmons are typically studied as physical properties of metal nanostructures rather than chemical tools that provide control over growth and ultimate particle dimensions. The methods of the present invention take advantage of plasmon excitation in the nanoprism growth process, both for Type 1 particles which grow from the initially produced colloidal particles to a size that depends on the dipole plasmon wavelength, and for Type 2 particles whose growth also requires dipole plasmon excitation, but is inhibited by quadrupole plasmon excitation. Without intending to be bound by any one theory, it is believed that plasmon excitation leads to ligand dissociation at the particle edges, whereby the local fields are the most intense, allowing the Type 1 particles to grow through the addition of silver atoms or clusters and the Type 2 particles to form by particle fusion. The results presented in the following examples are consistent with a fundamentally new type of particle growth and size control that is light initiated and driven, highly cooperative, and surface plasmon directed.

EXAMPLES

Example 1

This example illustrates one method of making silver colloids suitable for use in the methods of the present invention. AgNO$_3$ (99.998%) and NaBH$_4$ (99%) were obtained from Aldrich, and bis (p-sulfonatophenyl) phenylphosphine dihydrate dipotassium (BSPP) was purchased from Strem Chemicals, Inc. All H$_2$O was purified by a Barnstead Nanopure H$_2$O purification system (resistance=18.1 MΩ·cm). 100 mL of nanopure H$_2$O, 1 mL of 30 mM trisodium citrate, and 2 mL of 5 mM AgNO$_3$ solution were mixed in a 250 mL three neck flask. The flask was immersed in an ice bath, and the solution was bubbled with argon under constant stirring for approximately 30 minutes. 1 mL of 50 mM aqueous NaBH$_4$ (ice-cold, freshly made) was quickly injected into the solution under vigorous stirring. The clear solution immediately turned light yellow. The reaction was allowed to proceed for approximately 15 min, and 1 mL of 5 mM BSPP solution and a 0.5 mL aliquot of NaBH$_4$ were added to the solution in a dropwise fashion. The colloids were left overnight stirring in the dark. Transmission electron microscopy (TEM) analyses show that the as-prepared particles have an average diameter of 4.8±1.1 nm.

Example 2

This example illustrates the production of a nanoprism suspensions by the photo-initiated plasmon excitation means of the present invention. A xenon lamp (Novalight system, 150 W, light output approximately 12 W, Photon Technology, Inc.) was utilized as the light source for the photosynthetic experiments. Optical band filters (diameter=25 mm, band width=10 nm or 40 nm) were obtained from Intor, Inc. The photoconversion of nanospheres to nanoprisms was performed in a glass flask or quartz cell. The quartz cell was only used in double beam experiments when light less than 400 nm was introduced. The silver colloid was sealed in the reactor wrapped with aluminum foil. For the single beam excitation experiment, the 550±20 nm beam (green, approximately 100,000 Lux, measured with a digital light meter, Model LM-1, Family Defense Products) was introduced to the silver colloids through a hole (ca. 20 mm in diameter) on the aluminum wrap. The distance between the reactor and the light output window was approximately 8 cm. For the double beam excitation experiment, two holes (approximately 20 mm in diameter) were made in the aluminum wrap, and two beams (the 550±20 nm primary beam and a wavelength-varied secondary beam with FWHM approximately 10 nm) from two Xe lamps were simultaneously introduced to the silver colloid, with the beams forming a 90° angle. The silver colloids were exposed to the light sources for about 50 hours (variable with light intensity). To control the silver nanoprism size (edge length), a primary beam (450, 490, 520, 550, 600 and 670 nm, respectively, width=40 nm) coupled with a secondary beam (450 nm or 340 nm, width=10 nm) was used to photolyse the silver colloid. For the laser excitation experiment, the laser beam (532.8 nm, CW, light output approximately 0.2 W, Nd:YAG) was directly introduced to the reactor containing the silver colloid.

TEM imaging of the nanoprims was performed with a 200 kV Hitachi H8100. Approximately 400 particles were used for the particle size statistical analyses. High-resolution TEM imaging was carried out with a 200 kV field-emission Hitachi HF 2000 electron microscope equipped with a Gatan Imaging System. UV-VIS-NIR spectroscopic measurements of colloids were performed with a Cary 500 spectrometer. The emission spectrum of a fluorescent tube (white daylight type, Philips TLD 36 W/865 or General Electric 40 W) was measured with a HP 8453 diode array spectrophotometer, and is given in arbitrary units for the 250–800 nm range.

Example 3

This example provides a sample calculation of the temperature rise in the silver nanoparticles exposed to 550±20 nm beam excitation. The parameters for the silver colloid:

100 mL of silver colloid (silver atomic concentration=0.1 mM);

The volume of a Type 1 prism (edge length=70 nm, thickness=10 nm): $2.1 \times 10^{-17}$ cm$^3$;

The mass of a Type 1 prism=$2.1 \times 10^{-17}$ (cm$^3$)×10.5 (g/cm$^3$)=$2.2 \times 10^{-16}$ g;

The number of Type 1 prisms in 100 mL of colloid=$4.8 \times 10^{12}$;

The energy of a 550-nm photon=1240 (eV·nm)/550 (nm) =2.25 eV=$3.6 \times 10^{-9}$ J The 550-nm beam power approximately 0.2 Watt;

The 550-nm photon flux=0.2 (J/s)/$3.6 \times 10^{-19}$ (J/photon) =$5.6 \times 10^{17}$ photons/sec;

Bulk silver specific heat capacity=0.235 J/g/K (CRC Handbook of Chemistry and Physics, 83$^{rd}$ ed., London, New York)

The heat capacity of a Type 1 prism=0.235 (J/g/K)×$2.2 \times 10^{-16}$ (g/particle)=$5.2 \times 10^{-17}$ J/K.

In the calculation, it is assumed that the absorbed photon energy is rapidly equilibrated among the conduction electrons, resulting in hot electron gas. The hot electrons equilibrate with the phonons on a time scale of a few picoseconds, which leads to a temperature increase in the s silver lattice. The temperature increase of silver particles under 550±20 nm beam excitation can be estimated by the equation $\Delta T = \Delta H/C_p$, where, $\Delta H$ is the total absorbed energy, and $C_p$ is the heat capacity for silver nanoparticles (assumed to be the bulk value $C_p$=235 J/(KgK)). If one photon is absorbed by a Type 1 nanoprism, then $\Delta T$, the photon energy/heat capacity is 0.007 K.

In a second calculation, we assume that the beam energy (beam power=0.2 W, measured by a light meter) is 100% absorbed (for estimation of maximum temperature increase), and that there is a 1 picosecond time scale for heat transfer from the surface plasmon excited state to the silver lattice, and during this time there is no heat dissipation to the surroundings. In this case, $\Delta H$=0.2 (W)×$1 \times 10^{-12}$ (s), $C_p$=0.235 (JK$^{-1}$g$^{-1}$)×0.1 (L)×$0.1 \times 10^{-3}$(molL$^{-1}$)×108(gmol$^{-1}$), thus, $\Delta T$ is approximately equal to $10^{-9}$ K.

Once the electrons and lattice have reached equilibrium, the heat is finally dissipated into the surroundings (water and air) by phonon-phonon couplings. Energy "storing" by the silver lattice as temperature increases is negligible because the photon flux in these methods is extremely low, and the silver lattice can efficiently dissipate heat to the surroundings. In addition, multiple photon absorption is statistically negligible due to the extremely low photon flux.

Example 4

This example demonstrates the production and characterization of a suspension of nanoprims having a bimodal size distribution by the methods of the present invention. Colloidal silver nanoparticles (diameter 4.8±1.1 nm) were irradiated with a narrow band light source (using a 150 W xenon lamp (light output approximately 12 W) with an optical bandpass filter; center wavelength=550 nm, width=40 nm) for approximately 50 h. TEM shows that the colloid formed consists of two different size distributions of nanoprisms (FIG. 1A and inset), of which the smaller and the larger particles have average edge lengths of 70±12 nm and 150±16 nm, respectively. The thicknesses of both size nanoprisms are almost identical at 9.8±1.0 nm (FIGS. 1B and C). High-resolution TEM studies reveal that the {111} crystal face forms the top/base plane of the nanoprism, and three {110} crystal faces form the side planes of both sizes of nanoprisms. The growth process was been monitored by UV-VIS-NIR spectroscopy (FIG. 2A). Disappearance of the plasmon band (at ~395 nm) during the reaction is associated with the spherical silver particles and formation of two new strong bands (at 640 nm and 1065 nm, respectively) associated with the Type 1 and Type 2 nanoprisms, respectively. The band for the Type 1 prisms is initially centered at $\lambda_{max}$=680 nm and gradually blue shifts to $\lambda_{max}$=640 nm. The second strong band at $\lambda_{max}$=1065 nm is assigned to Type 2 particles. In addition to the two strong surface plasmon bands, two other weak resonances are observed at 340 and 470 nm, respectively (FIG. 2A curve 6).

Example 5

Figure 3:
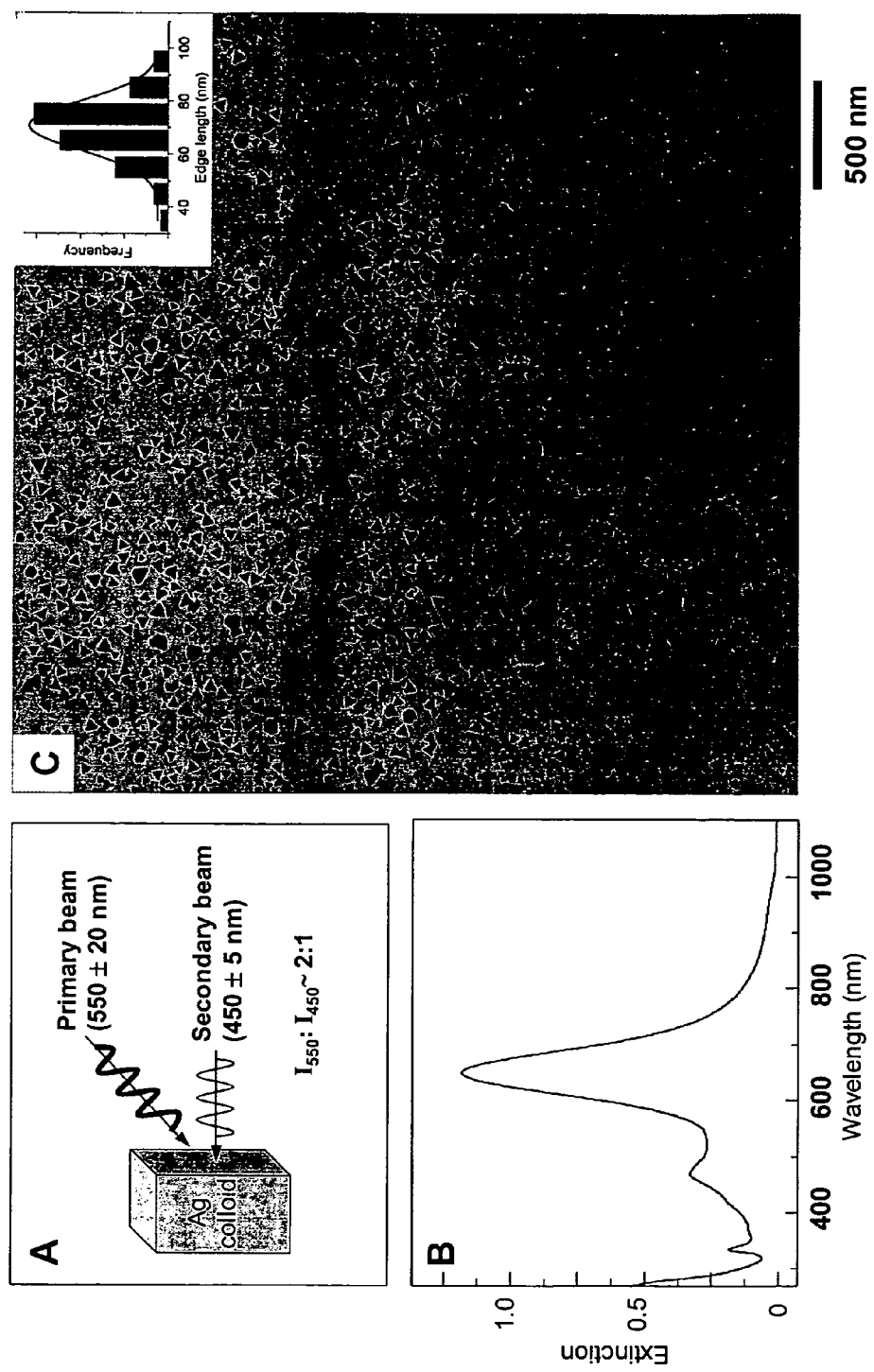
FIG. 3(A) is a schematic depicting dual beam excitation (primary: 550±20 nm, secondary: 450±5 nm).
FIG. 3(B) is the UV-VIS-NIR spectrum of a silver colloid.
FIG. 3(C) is a TEM image of the final silver nanoprisms (average edge length 70±8 nm, thickness 10±1 nm, images of prism stacks not shown). The inset shows a histogram characterizing the distribution as unimodal.

This example demonstrates the use of dual beam plasmon excitation to form silver nanoprisms of a discrete size. Silver nanoparticles (4.8±1.1 nm) were excited at two wavelengths, 550±20 nm (primary) and 450±5 nm (secondary) ($I_{550}$:$I_{450}$=2:1, FIG. 3A). Double-beam excitation at these wavelengths results in exclusive formation of the smaller Type 1 nanoprisms (72±8 nm), as evidenced by UV-VIS-NIR spectra and TEM analysis (FIGS. 3B and C). A 550-nm/340-nm coupled beam, in which the 340-nm light coincides with the out-of-plane quadrupole resonances of the Type 1 and Type 2 nanoprisms, also inhibits the growth of Type 2 nanoprisms and the final UV-VIS-NIR spectrum is very similar to the spectrum obtained from the two beam 550-nm/450-nm experiment. However, in the cases of 550-nm/395-nm, 550-nm/610-nm, and 550-nm/650-nm coupled beams, in which the secondary wavelengths fall within the dipole resonances of the silver nanospheres (395 nm) and Type 1 nanoprisms (610 and 650 nm), respectively, bimodal growth is observed (FIG. 8).

Example 6

Figure 4:
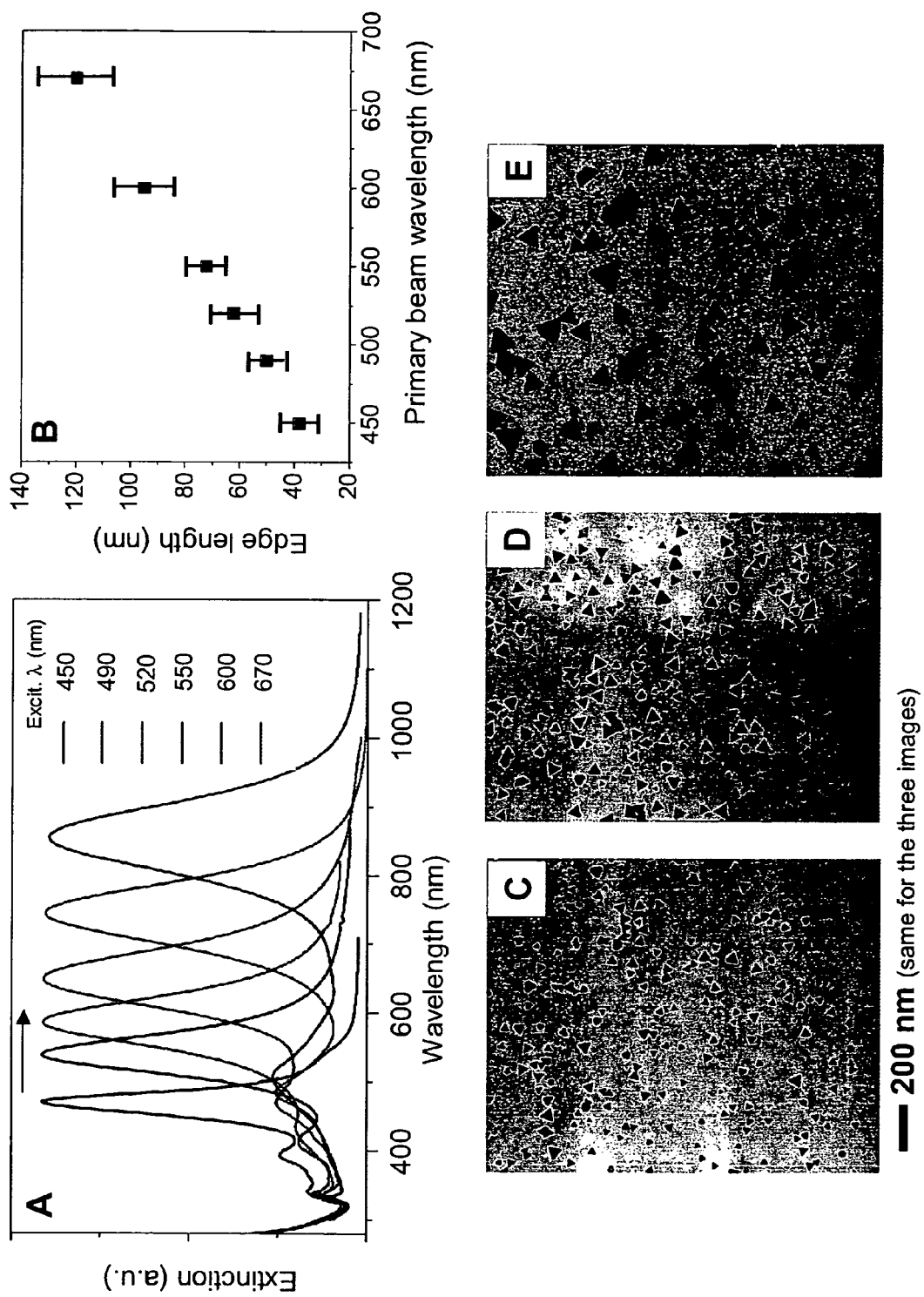
FIG. 4(A) Shows the optical spectra for six different sized nanoprisms (edge length: 38±7 nm, 50±7 nm, 62±9 nm, 72±8 nm, 95±11 nm, and 120±14 nm) prepared by varying the primary excitation wavelength (central wavelength at 450, 490, 520, 550, 600, and 670 nm, respectively, width=40 nm) coupled with a secondary wavelength (340 nm, width=10 nm). (B) The edge lengths are plotted as a function of the primary excitation wavelength.
FIG. 4(C)–(E) show TEM images of silver nanoprisms with respective average edge lengths of 38±7 nm, 62±9 nm, and 120±14 nm.
Figure 5:
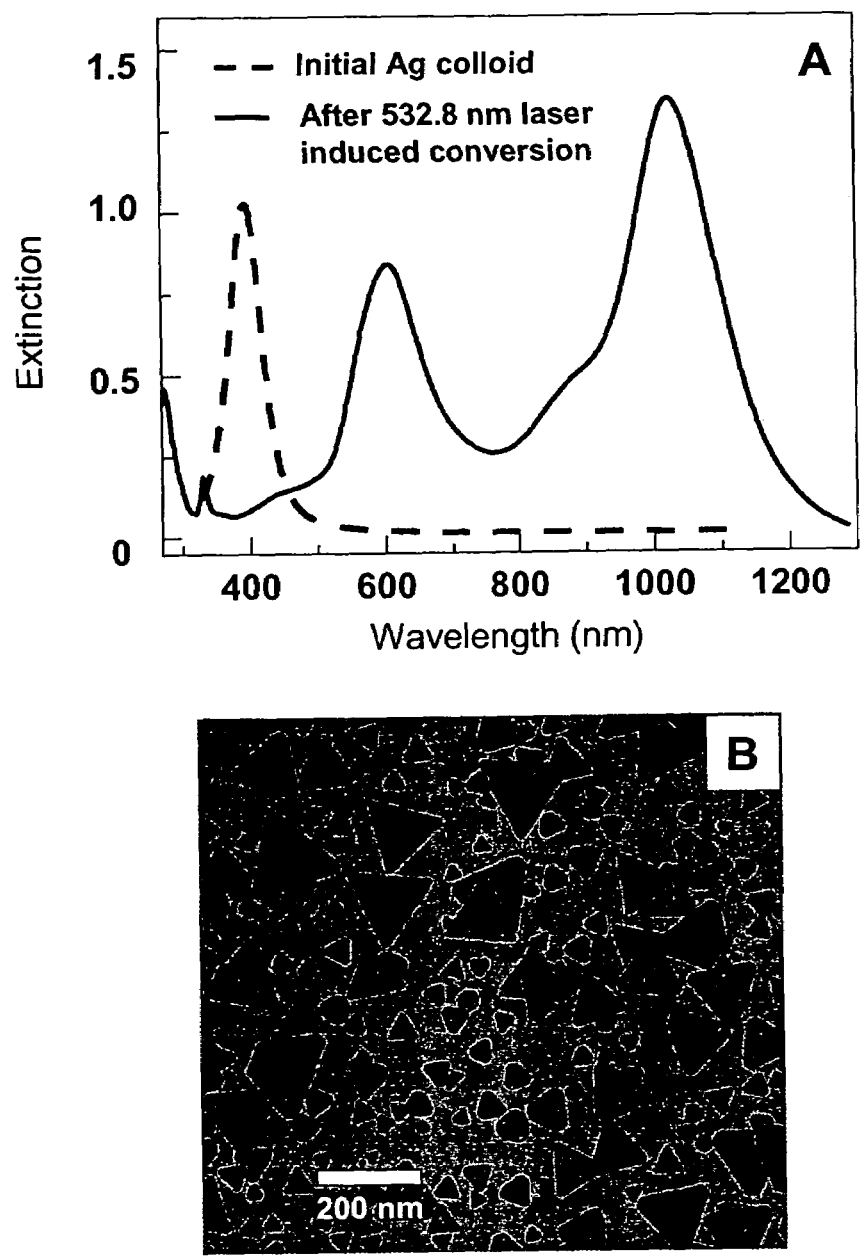
FIG. 5(A) shows UV-VIS-NIR spectra of a silver colloid before (dash line) and after (solid line) excitation with a 532.8 nm laser beam (Nd:YAG, approximately 0.2 W).
FIG. 5(B) is a TEM image of the resulting nanoprisms after laser induced conversion shows a bimodal size distribution.

This example demonstrates a way of controlling nanoprism size and shape using light as a directing element. The silver colloid was exposed to a primary light source (450–700 nm) with a fixed secondary beam (340 nm, corresponding to out-of-plane quadrupole plasmon excitation). Silver nanoprisms with six different average edge lengths (38±7 nm, 50±7 nm, 62±9 nm, 72±8 nm, 95±11 nm, and 120±14 nm) but similar particle thickness (10±1 nm) were synthesized from colloidal particles (4.8±1.1 nm) using primary excitation wavelengths of 450±20 nm, 490±20 nm, 520±20 nm, 550±20 nm, 600±20 nm, and 670±20 nm, respectively. The average edge lengths of the resulting nanoprisms correlate well with the wavelength of the primary excitation source (FIG. 4B), which shows that a longer primary excitation wavelength produces larger particles with in-plane dipole plasmons (the red-most peak in each spectrum) that are red-shifted with respect to the excitation wavelength (FIG. 4A).

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of forming nanoprisms comprising exposing silver particles to light having a narrow band of wavelengths in the range of between about 400 nm and about 700 nm, said wavelengths capable of exciting a dipole plasmon mode of the silver particles to form silver nanoprisms having a bimodal size distribution.

2. The method of claim 1, wherein the silver particles are present in a colloid.

3. The method of claim 2, wherein the colloid comprises a reducing agent.

4. The method of claim 3, wherein the reducing agent is $NaBH_4$.

5. The method of claim 2, wherein the colloid comprises a stabilizing agent.

6. The method of claim 5, wherein the stabilizing agent is bis(p-sulfonatophenyl)phenylphospine dehydrate dipotassium.

7. The method of claim 2, wherein the colloid comprises a stabilizing agent and a surfactant.

8. The method of claim 7, wherein the surfactant is trisodium citrate.

9. The method of claim 7, wherein the ratio of the stabilizing agent to the surfactant is about 0.3:1.

10. The method of claim 1, wherein the silver particles have a diameter of less than about 15 nm.

11. The method of claim 1, wherein the silver particles have a diameter of less than about 10 nm.

12. The method of claim 1, wherein the silver particles have a diameter of between about 2 nm and about 6 nm.

13. The method of claim 1, wherein the silver particles have a diameter of about 4.8 nm.

14. The method of claim 1, wherein the nanoprisms are single crystalline.

15. The method of claim 1, wherein the nanoprisms have a {111} crystal face on a base plane of the nanoprism and a {110} crystal face on a side plane of the nanoprism.

16. The method of claim 1, wherein the step of exposing is conducted for a period of less than about 60 hours.

17. The method of claim 1, wherein the wavelength of the light is in the range of between about 530 nm and about 570 nm.

18. The method of claim 1, wherein the wavelength of the light is about 550 nm.

19. The method of claim 1, wherein the wavelength of light is about 532.8 nm.

20. The method of claim 1, wherein the silver nanoprisms display plasmon bands having $\lambda$max at 640 nm and 1065 nm.

21. The method of claim 1, wherein the silver nanoprisms display plasmon bands having $\lambda$max at 340 nm and 470 nm.

22. The method of claim 1, wherein the silver nanoprisms display a plasmon band having $\lambda$max at 640 nm.

23. A method of forming a nanoprism comprising exposing silver particles to a primary and a secondary wavelength of light and exciting a dipole plasmon mode in the silver particles with the primary wavelength of light and a quadrupole resonance mode of the nanoprism with the secondary wavelength of light to form silver nanoprisms having a unimodal size distribution, wherein the primary and secondary wavelengths of light comprise narrow bands of wavelengths of light.

24. The method of claim 23, wherein the secondary wavelength of light is about 340 nm.

25. The method of claim 24, wherein the primary wavelength of light is in the range of about 450 nm and about 700 nm.

26. The method of claim 25, wherein the primary wavelength of light is in the range of about 430 nm and about 470 nm and the nanoprisms have an edge length between about 31 nm and about 45 nm.

27. The method of claim 25, wherein the primary wavelength of the light is in the range of about 470 nm and about 510 nm and the nanoprisms have an edge length between about 53 nm and about 57 nm.

28. The method of claim 25, wherein the primary wavelength of the light is in the range of about 500 nm and about 540 nm and the nanoprisms have an edge length between about 53 nm and about 71 nm.

29. The method of claim 25, wherein the primary wavelength of light is in the range of about 530 nm and about 570 nm and the nanoprisms have an edge length between about 64 nm and about 80 nm.

30. The method of claim 25, wherein the primary wavelength of light is in the range of about 580 nm and about 620 nm and the nanoprisms have an edge length between about 84 nm and 106 nm.

31. The method of claim 25, wherein the primary wavelength of light is in the range of about 650 nm and about 690 nm and the nanoprisms have an edge length between about 106 nm and 134 nm.

* * * * *